United States Patent [19]
Clark

[11] 3,778,922
[45] Dec. 18, 1973

[54] BIRDHOUSE SPARROW TRAP
[76] Inventor: James Webster Clark, Mendon, Mo. 64660
[22] Filed: July 8, 1971
[21] Appl. No.: 103,353

[52] U.S. Cl. .................................... 43/61, 43/67
[51] Int. Cl. .......................................... A01m 23/02
[58] Field of Search ........................... 43/61, 67, 76

[56] References Cited
UNITED STATES PATENTS
| 1,349,453 | 8/1920 | Hall | 43/67 |
| 2,207,015 | 7/1940 | Lawrence | 43/67 |
| 2,769,273 | 11/1956 | Martin | 43/61 |

Primary Examiner—Louis G. Mancene
Assistant Examiner—Daniel J. Leach

[57] ABSTRACT

A trap for catching English sparrows, the device comprising a configurated enclosure having two separate chambers with a partition therebetween. The first of the chambers has an access opening from the outside thereinto and an exit opening through the partition into the second chamber, and a mechanism whereby a sparrow after entering the first chamber then closes the entrance opening and at the same time opens the exit opening so that the bird can pass through the partition into the second chamber from which it can be manually retrieved through a separate door.

2 Claims, 7 Drawing Figures

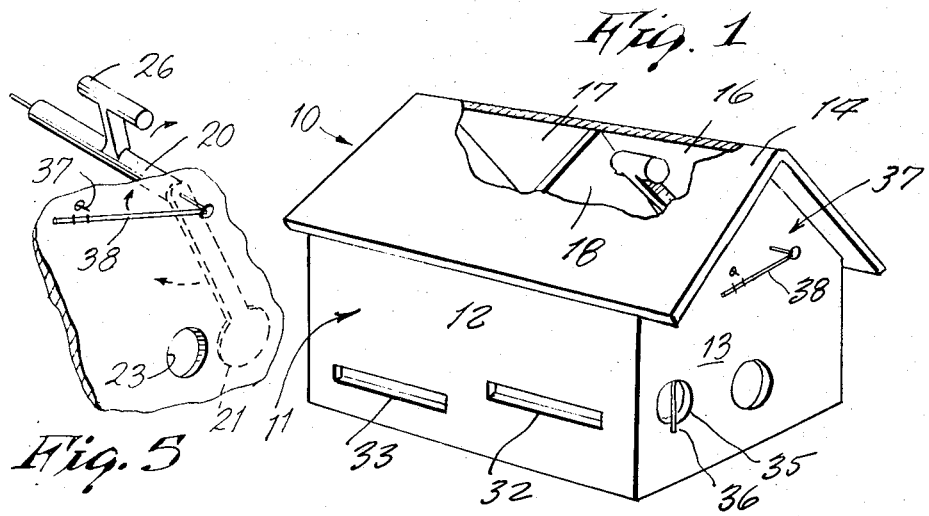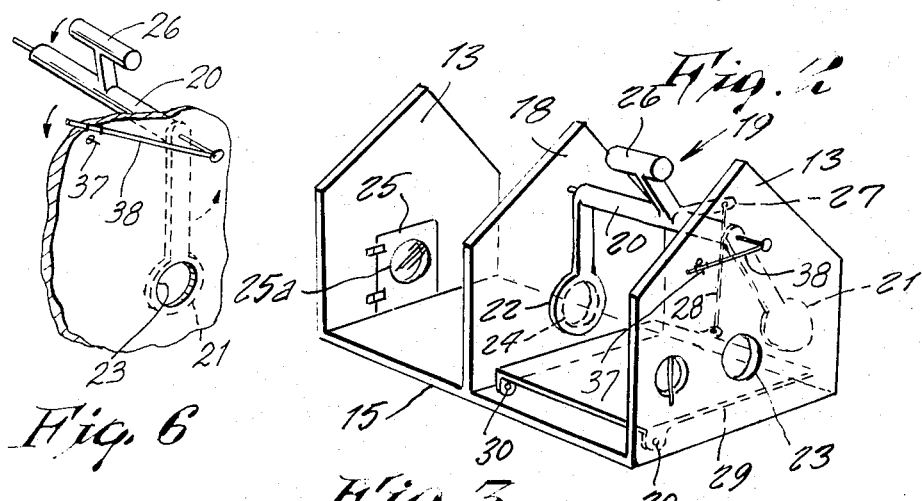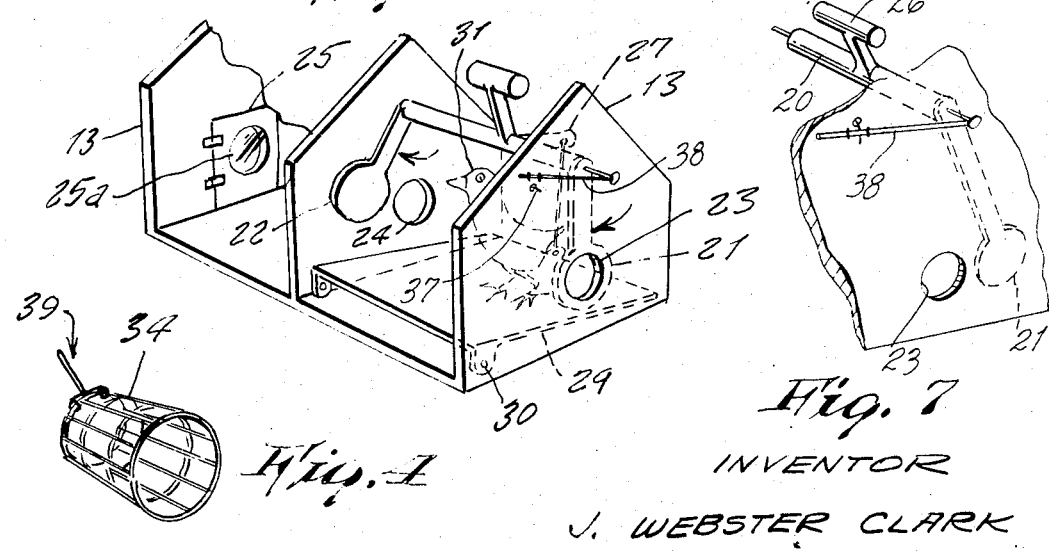
INVENTOR
J. WEBSTER CLARK

BIRDHOUSE SPARROW TRAP

This invention relates generally to bird traps.

A principal object of the present invention is to provide a trap for catching English sparrows such as are a principal cause of trouble with purple martins. It is generally well known that sparrows are known to molest purple martins and take away rooms for nesting in the purple martin boxes. Far too many martin houses produce mostly sparrows instead of martins.

Another object of the present invention is to provide a sparrow trap which has a configuration of a purple martin birdhouse so as to attract the sparrows thereto.

Other objects of the present invention are to provide a birdhouse sparrow trap which is of simple design, inexpensive to manufacture, rugged in construction, easy to use and efficient in operation.

These and other objects will be readily evident upon a study of the following specification and the accompanying drawing wherein:

FIG. 1 is a perspective view of the present invention shown partly broken away to show the interior construction;

FIG. 2 is a perspective view of the device with the enclosing housing removed therefrom;

FIG. 3 is a view generally similar to FIG. 2 and showing a mechanism thereof in a subsequent stage of operation; and FIG. 4 is a perspective view of a wire funnel which is secured to an opening in a chamber of the birdhouse for a purpose to be described;

FIGS. 5, 6 and 7 are detail perspective views of the operating mechanism shown in different positions relative to the entrance opening.

Referring now to the drawing in detail, reference numeral 10 represents a birdhouse sparrow trap, according to the present invention, wherein there is a housing 11 of birdhouse configuration and which includes opposite side walls 12, opposite end walls 13, a peaked roof 14 and a bottom floor 15. The interior of the housing is divided into a first compartment 16 or chamber, and a second chamber 17 which are separated by means of a transverse partition 18 therebetween.

An operating mechanism 19 is contained within the first chamber 16 as shown in FIGS. 2 and 3 of the drawing. The operating mechanism 19 includes a wooden rod 20 which at its opposite ends is pivoted and supported, the rod 20 having at its opposite ends a paddle 21 and a paddle 22, the paddle 21 being positioned adjacent an entrance opening 23 in the end wall 13 while the paddle 22 is positioned for movement across an exit opening 24 in the partition 18. As shown in FIGS. 2 and 3 of the drawing, it is to be noted that only one of the paddles at a time may close one of the openings while the other paddle is out of the way providing access through the associated opening therewith.

The opposite end wall 13 at one end of the chamber 17 is provided with a hinge mounted door 25 so to provide access for a person to place his hand thereinto and retrieve a bird from within the chamber 17. The door 25 has a glass window 25a mounted therein.

The mechanism 19 further includes a counter weight 26 rigidly affixed by means of a radially extending arm secured to the rod 20. Additionally another arm extending radially from the rod 20 has one end of a wooden rod 28 secured thereto, the opposite end of the rod being attached to one end of a pivotable floor 29 located above the floor 15 within the compartment 16. The opposite end of the floor 29 is pivotable about pins 30 secured in the end wall 13 and the partition 18.

In operative use, the trap is in a set position when the mechanism 19 is in the position as shown in FIG. 2 and wherein the entrance opening 23 is open so to permit access for a sparrow 31 to enter the chamber 16. It is to be noted that the mechanism in a set position thus has the exit opening 24 in the partition 18 closed. The pivotable floor 29 is in a horizontal position and is supported by means of the counterweight 26 balancing the mechanism. After a bird 31 enters the entrance opening 23, he lights upon the pivotable floor 29 thus upsetting the balance of the mechanism 19 by causing the pivotable floor 29 to pivot about the pins 30, thus causing the paddle 21 to move in front of the entrance opening 23 closing the same while the paddle 22 opens the exit opening 24 through which the bird may now pass so to enter the chamber 17. After moving therethrough, the bird thus attempting to escape through the glass in door 25, the bird enters the chamber 17 while the pivotable floor 29 again lifts upwardly into a horizontal position so that the paddle 22 closes the exit opening 24 and prevents the bird from returning to chamber 16.

It is to be noted that on the side walls 12 there are a pair of ventilation openings 32 and 33 for permitting the bird to breath when within the chambers 16 or 17, and to push the sparrow if he does not want to go through opened door 25 into wire funnel or into the hands of the person removing him.

The above wire funnel shown in FIG. 4, and made of hardware cloth or the like may be fitted over the opening in the door 25 so that the bird 31 in his attempt to escape will enter the funnel from where he will be manually retrieved. Alternately, the door 25 may be manually opened by a person so to place his hand into the chamber 17 and manually lift out the captured sparrow. This funnel is not part of the trap but only a convenience, if desired, in removing trapped sparrows.

It is to be noted that upon the front end wall 13 there is provided an exit opening 35 having a one-way swinging wire 36 thereacross, the opening 35 being used to let wrens out of the trap in case the same are captured, the wire 36 preventing the opening 35 to be used as an entrance for such birds. The opening is not big enough (1 inch) to let sparrows out.

Upon the front wall 13 the trap has an indicating mechanism which indicates if the trap has been thrown to capture a sparrow, without the necessity of taking the trap down from the pole. The indicating mechanism includes a wire 38 soldered at right angles to a nail extending through the end wall 13 and attached to the rod 20, a string 37 being put above the wire when the trap is put out. When the trap is thrown, wire 38 swings over and above string 37 and then pushes the string down when the trap resets itself. Thus it is necessary to take down the trap only if a sparrow has been caught.

FIG. 4 shows a wire funnel which is stapled to opening 24 in second chamber 17. It has a stiff wire 39 and swings only one way and prevents the trapped sparrow from going back through door 24 or interfering with operation of paddle 22.

It is to be of course understood that the present trap automatically resets itself so that several sparrows may be captured subsequently and the trap may be cleaned out, thus only periodically.

Trapped sparrows fly or hop to the highest part of their enclosures, so a ceiling must be placed below the rod 20 to prevent the sparrows from going up to this "perch" instead of going through door 24.

For greater clarity to understand how the indicator mechanism works, reference is now made to FIGS. 5, 6 and 7, wherein a wire 38 is soldered to a nail driven in the end of rod 20 and rotating together with the rod when a sparrow enters the trap. The members 37 and 38 are outside of the trap. In FIG. 7 a flexible string 37, conspicuously colored for easy visiblity, extends horizontally straight out from the birdhouse wall. When the sparrow enters the trap, wire 38 is rotated up and slides over and above member 37, which is short enough to permit this. In FIG. 7, the sparrow having moved from chamber 16 to chamber 17, the trap now automatically resets itself. Wire 38 has now pushed string 37 down, and it points down, indicating that a bird has been caught in the trap. The two spaced-apart, transverse elements shown in the drawing to cross the wire 38 are little wires to hold the string 37 from being blown by the wind sideways and dropping below wire 38 without the trap being thrown. This of course would falsely indicate that a sparrow has been caught.

A ceiling of similar height above the floor should be placed in chamber 17 to prevent sparrows from flapping and hopping to top of the box. This noise would scare other sparrows about to enter door 23. This upper portion of chamber 17 may be used for a wren room, as wrens in the box seem to decoy sparrows to the trap. The wren opening should be only 1 inch in diameter.

What I now claim is:

1. In a birdhouse sparrow trap, the combination of a housing configurated in the form of a purple martin birdhouse, said housing including a peaked roof, opposite side walls, opposite end walls and a bottom wall, the interior of said housing being divided into a first chamber and a second chamber by means of a partition therebetween, an entrance opening in the end wall of said first chamber, and an exit opening from said first chamber in said partition, and a mechanism for alternately allowing passage of a sparrow through said entrance opening and said exit opening, said mechansim comprising a pivotable rod having a depending paddle at each end thereof, one of said paddles being adaptable to close said entrance opening and the other said paddle being adaptable to close said exit opening, a radially extending arm integral with said rod, the outward end of said arm having one end of a cord secured thereto, the opposite end of said cord being attached to one end of a pivotable floor which is pivotable about its opposite end, said pivotable floor being normally maintained in a balanced horizontal position by means of a counterweight at the end of a second radial arm secured to said rod.

2. The combination as set forth in claim 1 wherein the other said end wall forming an end of said second chamber is provided with a pivotable door for retrieving a captured sparrow, said pivotable door having an opening therein within which there is a removably mounted a wire funnel made of hardware cloth.

* * * * *